United States Patent
Bangalore et al.

(10) Patent No.: US 8,170,961 B2
(45) Date of Patent: May 1, 2012

(54) TEXT EDIT TRACKER THAT CATEGORIZES COMMUNICATIONS, DETERMINES DISTANCES BETWEEN TEMPLATES, CODES TEMPLATES IN COLOR, AND USES A MORPHING SCORE BASED ON EDITS

(75) Inventors: Srinivas Bangalore, Morristown, NJ (US); David J. Smith, Millington, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 811 days.

(21) Appl. No.: 12/252,732

(22) Filed: Oct. 16, 2008

(65) Prior Publication Data

US 2010/0100515 A1    Apr. 22, 2010

(51) Int. Cl.
*G06F 11/00* (2006.01)
(52) U.S. Cl. ......................................................... 706/12
(58) Field of Classification Search .................... 706/12, 706/45
See application file for complete search history.

(56) References Cited

U.S. PATENT DOCUMENTS

| | | | |
|---|---|---|---|
| 7,752,233 B2* | 7/2010 | Vempala et al. | 707/802 |
| 2003/0170597 A1* | 9/2003 | Rezek | 434/219 |
| 2006/0195353 A1* | 8/2006 | Goldberg et al. | 705/10 |
| 2010/0153440 A1* | 6/2010 | Hubert | 707/769 |
| 2011/0055192 A1* | 3/2011 | Tang et al. | 707/706 |

* cited by examiner

*Primary Examiner* — David Vincent
(74) *Attorney, Agent, or Firm* — Greenblum & Bernstein, P.L.C.

(57) ABSTRACT

A method for monitoring edits to a template for responding to an incoming communication includes categorizing the incoming communication into a category associated with the template for a response to the incoming communication. The method also includes determining distances between the template and each of a set of responses based on the template, at a predetermined level of granularity. The method also includes coding the template in accordance with the determined distances and displaying the coded template. A method for extracting a new template based on responses to an existing template includes selecting factors that affect quantitative measures for preparing a response to the incoming communication. The method includes using a mathematical model of the factors to cluster a set of responses created based on the existing template into two clusters. The method further includes restricting a first cluster centroid to be the existing template and searching for a second cluster centroid for a second cluster.

19 Claims, 11 Drawing Sheets

Algorithm 2 Compute $k$ centroids for a set of strings $S$ using k-median clustering algorithm 1: $c_s = \phi$ // centroid of string $s$'s cluster
2: $ce_i = \phi$ // centroid of cluster $i$
3: $numcl = 0$ // number of cluster created so far
4: $Cl_i = \phi$ // members of cluster $i$
5: while $(numcl \leq k) \wedge (numcl \leq |S|)$ do
6:    if $numcl = 0$ then
7:       $ce_0 = \underset{c \in S}{argmin} \sum_{s \in S} Dist(c, s)$
8:    else // select the string $(s)$ that is farthest from its centroid $(c_s)$
9:       $ce_{numcl} = \underset{s \in S}{argmax}\, Dist(c_s, s)$
10:    end if
     // Move strings to the closest cluster and compute centroids until the set of centroids don't change
11:    repeat
12:       for all $s \in S$ do
13:          $i^* = \underset{0 \leq i \leq numcl}{argmin}\, Dist(ce_i, s)$
14:          $c_s = ce_{i^*}$
15:          $Cl_{i^*} = Cl_{i^*} \cup \{s\}$
        // Computed the closest cluster centroid $ce_i$ to $s$.
16:       end for
     // Recompute the cluster centroids $ce_i$
17:       for all $i$ such that $0 \leq i \leq numcl$ do
18:          $ce_i = \underset{c \in Cl_i}{argmin} \sum_{s \in Cl_i} Dist(c, s)$
19:       end for
20:    until set of centroids does not change
21:    $numcl = numcl + 1$ // new cluster added
22: end while

FIGURE 3

Algorithm 1 Compute HotSpots for a template $T$ given a response set $\mathcal{R}$ 1: $EdEv = \phi$
2: $T = s_1 s_2 \ldots s_n$
3: $T_s = \{s_i | 1 \leq i \leq n\}$
4: $R_s = \{r_i^j | R_j \in \mathcal{R}, R_j = r_1^j r_2^j \ldots r_{m_j}^j, 1 \leq i \leq m_j\}$
5: $Index : \{T_s \cup R_s\} \to \mathbb{I}$
6: $T_{in} = Index(s_1) Index(s_2) \ldots Index(s_n)$
7: for all $R \in \mathcal{R}$ do
8:     $R = r_1 r_2 \ldots r_{n_R}$
9:     $R_{in} = Index(r_1) Index(r_2) \ldots Index(r_{n_R})$
    // compute distance with sentences as tokens and return the alignment and score
10:     $(alignment, score) = IndDist(T_{in}, R_{in})$
    // for each of the sentences in T, update its map
11:     for all $s_i \in T$ do
12:         $in = Index(s_i)$
13:         if $(s_i, \epsilon) \in alignment$ then
14:             $EdEv[in].map = EdEv[in].map \cup \{*delete*\}$
15:         else // $(s_i, r_j) \in alignment$
16:             $EdEv[in].map = EdEv[in].map \cup \{r_j\}$
17:         end if
18:     end for
19: end for
    // Cluster the response sentences aligned for each template sentence
20: for all $s_i \in T$ do
21:     $in = Index(s_i)$
22:     $Cl = KmedianCl(EdEv[in].map, ncl)$
23: end for

FIGURE 4

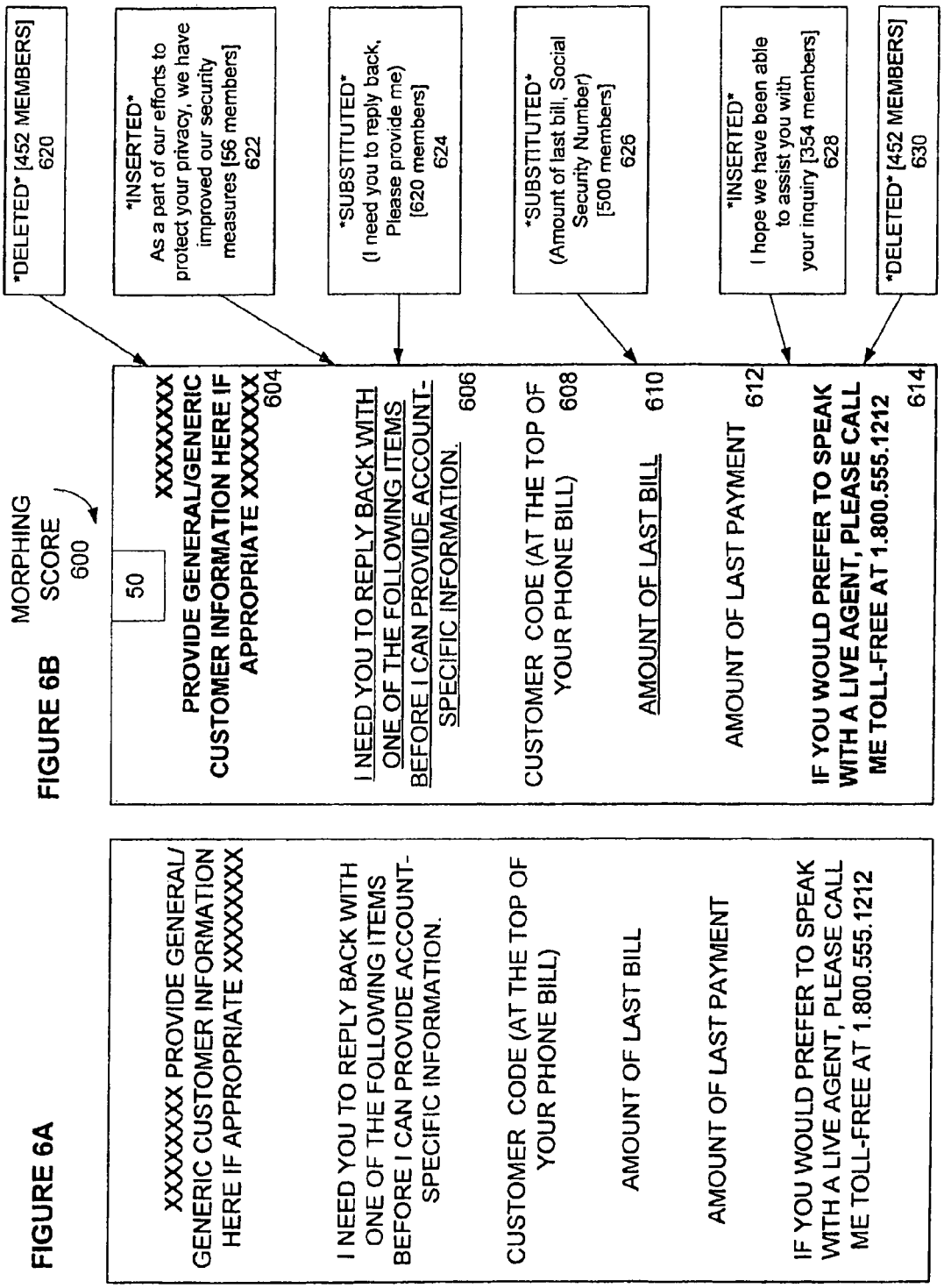

GREETINGS,

Thank you for letting me know that you've been unable to send an online order to upgrade your NAMEIDENTITY service. Please accept my apologies for any problems this issue may have caused you. You are a highly valued customer.

I understand your concerns and I'll be happy to address them. I am investigating this issue. I have already made a personal commitment to email you tomorrow, with the resolution. Thank you for your patience and for choosing the company. We appreciate your business and continued loyalty.

Sincerely,
Agent.FirstName

FIGURE 7B

GREETINGS,

Thank you for your recent email. On behalf of the company, I would like to extend my sincere apology for the problems you encountered when (XXX over key with appropriate response XXX).

It is our goal to provide excellent customer service, and I am sorry that we did not meet that objective. Your input is very valuable, and we will take your feedback into consideration.

Regards,
Agent.FirstName

FIGURE 7A

Greetings Contact.FirstName,

Thank you for your email in regard to XXXXXXXX. I will be happy to assist you with your inquiry.

XXX BODY XXX

If I can be of any further assistance, Please reply directly to this email. Thank you for using our company. We appreciate your business and continued loyalty.

Regards,
Agent.First Name

FIGURE 8

TEXT EDIT TRACKER THAT CATEGORIZES COMMUNICATIONS, DETERMINES DISTANCES BETWEEN TEMPLATES, CODES TEMPLATES IN COLOR, AND USES A MORPHING SCORE BASED ON EDITS

BACKGROUND

1. Field of the Disclosure

The present disclosure relates to monitoring and tracking edits to predefined email templates for responding to communications. More particularly, the present disclosure relates to determining and displaying edit information for a predefined email template.

2. Background Information

Email-based interaction with customers is increasingly addressing the needs of day-to-day and business functions of large organizations. As email evolves into a preferred method of communication, customer care agents may try to balance the demands of several customers at once. An organization may therefore monitor email-based interactions with customers to determine the efficiency and efficacy of these interactions.

Two metrics for evaluating email-based customer interactions include average handling time and customer experience evaluation. Average handling time measures the time taken from when a customer email is opened to the time when a prepared response is sent to the customer. Customer experience evaluation determines customer satisfaction through a survey of a random set of customers who have interacted with an email customer care center. In order to obtain optimal values for these metrics, an email customer care center may provide customer care agents with predefined templates to assist the agents in composing a response to a customer emails. The agent may edit a predefined template to more accurately address the content of the customer communications and any specifics of the current situation, issue or request.

The more the predefined template is edited, the less useful that template is in minimizing the average handling time associated with dealing a single customer interaction. That is, the longer a customer care agent is editing a predefined template, the less time that customer care agent is responding to emails from other customers. Further, issues arise in accurately determining the contents of a response that will satisfy the needs and requirements of the customer.

BRIEF DESCRIPTION OF THE DRAWINGS

FIG. 3 is an algorithm for aligning a response with a template, according to an aspect of the present disclosure;

FIG. 4 is an algorithm for clustering edit events for a template and a set of responses to the template, according to an aspect of the present disclosure;

FIG. 6A is an exemplary template;

FIG. 6B shows a visually coded exemplary template displayed with centroids;

FIGS. 7A and 7B show a current template and a new template extracted from responses to the current template;

FIG. 8 is an exemplary generic template;

DETAILED DESCRIPTION

Figure 1:
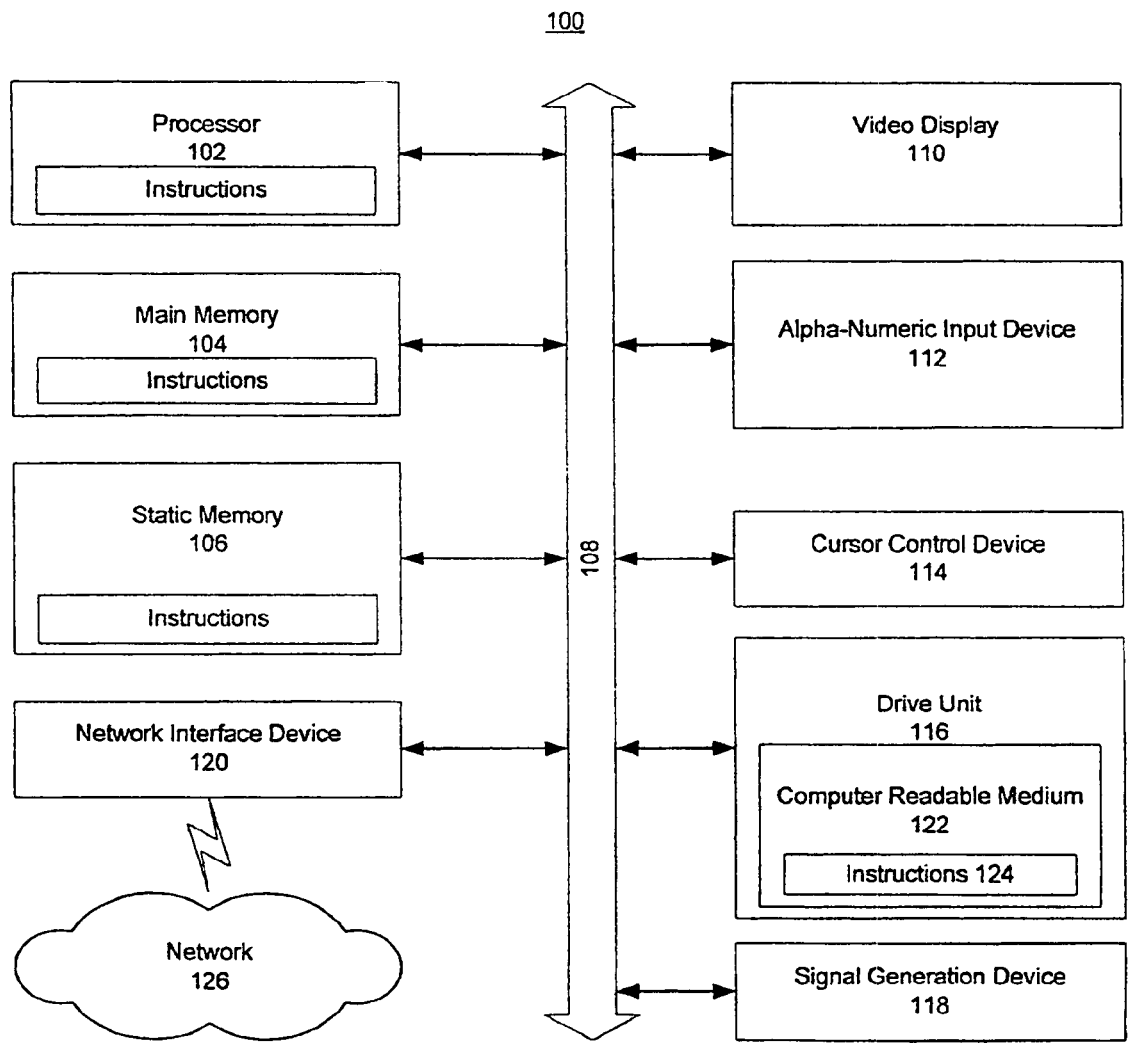
FIG. 1 shows an exemplary general computer system that includes a set of instructions for text edit visualization.

In view of the foregoing, the present disclosure, through one or more of its various aspects, embodiments and/or specific features or sub-components, is thus intended to bring out one or more of the advantages as specifically noted below.

According to an embodiment of the present disclosure, a method for monitoring edits to a template for responding to an incoming communication includes categorizing the incoming communication into a category associated with the template for a response to the incoming communication. The method includes determining distances between the template and each of a set of responses, at a predetermined level of granularity. The method also includes coding the template in accordance with the determined distances. The method also includes displaying the coded template.

According to one aspect of the present disclosure, the method includes determining edit events at the predetermined level of granularity.

According to another aspect of the present disclosure, the edit events are based on substitutions, insertions and deletions to the template at the predetermined level of granularity.

According to yet another aspect of the present disclosure, a subset of the edit events are selected for display based on clustering tokens for each of the set of responses based on the template.

According to still another aspect of the present disclosure, the subset of edit events are displayed coded in accordance with a selected characteristic.

According to one aspect of the present disclosure, the selected characteristic is a frequency of occurrence.

According to another aspect of the present disclosure, overlap among tokens is determined based on at least one of an n-gram overlap algorithm and a Levenshtein distance metric.

According to yet another aspect of the present disclosure, the tokens are clustered based on a k-median algorithm.

According to still another aspect of the present disclosure, centroids determined as a result of clustering are displayed with the template at each predetermined level of granularity.

According to one aspect of the present disclosure, the template is coded according to color and the template is displayed with a morphing score determined based on edits made to the template.

According to another aspect of the present disclosure, the predetermined level of granularity is one of a word, sentence and paragraph.

According to yet another aspect of the present disclosure, the template is displayed with a morphing score determined based on edits made to the template.

According to one embodiment of the present disclosure, a method for extracting a new template based on responses to an existing template includes selecting factors that affect quantitative measures for preparing a response to an incoming communication. The method includes using a mathematical model of the factors to cluster a set of responses created based on the existing template into two clusters. The method includes restricting a first cluster centroid to be the existing template. The method further includes searching for a second cluster centroid for a second cluster.

According to one aspect of the present disclosure, the second cluster centroid is generalized to serve as the new template.

According to another aspect of the present disclosure, the incoming communication is facsimile, electronic mail, text message or instant message.

According to yet another aspect of the present disclosure, a quantitative measure for determining a response based on the new template is less than a quantitative measure for determining a response based on the existing template and a qualitative characteristic of the response based on the new template is superior to a qualitative characteristic of the response based on the existing template.

According to still another aspect of the present disclosure, the factors include at least one of the length in words of the incoming communication, the length in words of the response, the total number edits between the template and the response, the normalized edit score, the number of individual events of the edit distance, insertions, deletions, identity, the number of block substitutions, block insertions, and block deletions.

According to an embodiment of the present disclosure, a tangible computer readable medium storing a computer program recorded on the computer readable medium for monitoring edits to a template for responding to an incoming communication includes a categorizing code, recorded on the tangible computer readable medium, executable to categorize the incoming communication into a category associated with the template for a response to the incoming communication. The tangible computer readable medium includes a determining code, recorded on the tangible computer readable medium, executable to determine distanced between the template and each of a set of responses based on the template, at a predetermined level of granularity. The tangible computer readable medium also includes an encoding code, recorded on the tangible computer readable medium, executable to code the template in accordance with the determined distances. The tangible computer readable medium also includes a displaying code, recorded on the tangible computer readable medium, executable to display the coded template.

According to one aspect of the present disclosure, the distance between the template and each of the set of responses is based on a Levenshtein edit distance metric.

According to yet another aspect of the present disclosure, the template is displayed with a morphing score normalized with respect to a length of the template.

According to yet another aspect of the present disclosure, a previous coded version of the template is displayed with the coded template.

FIG. 1 is an illustrative embodiment of a general computer system, on which a method to provide visualizations of edits to a text can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
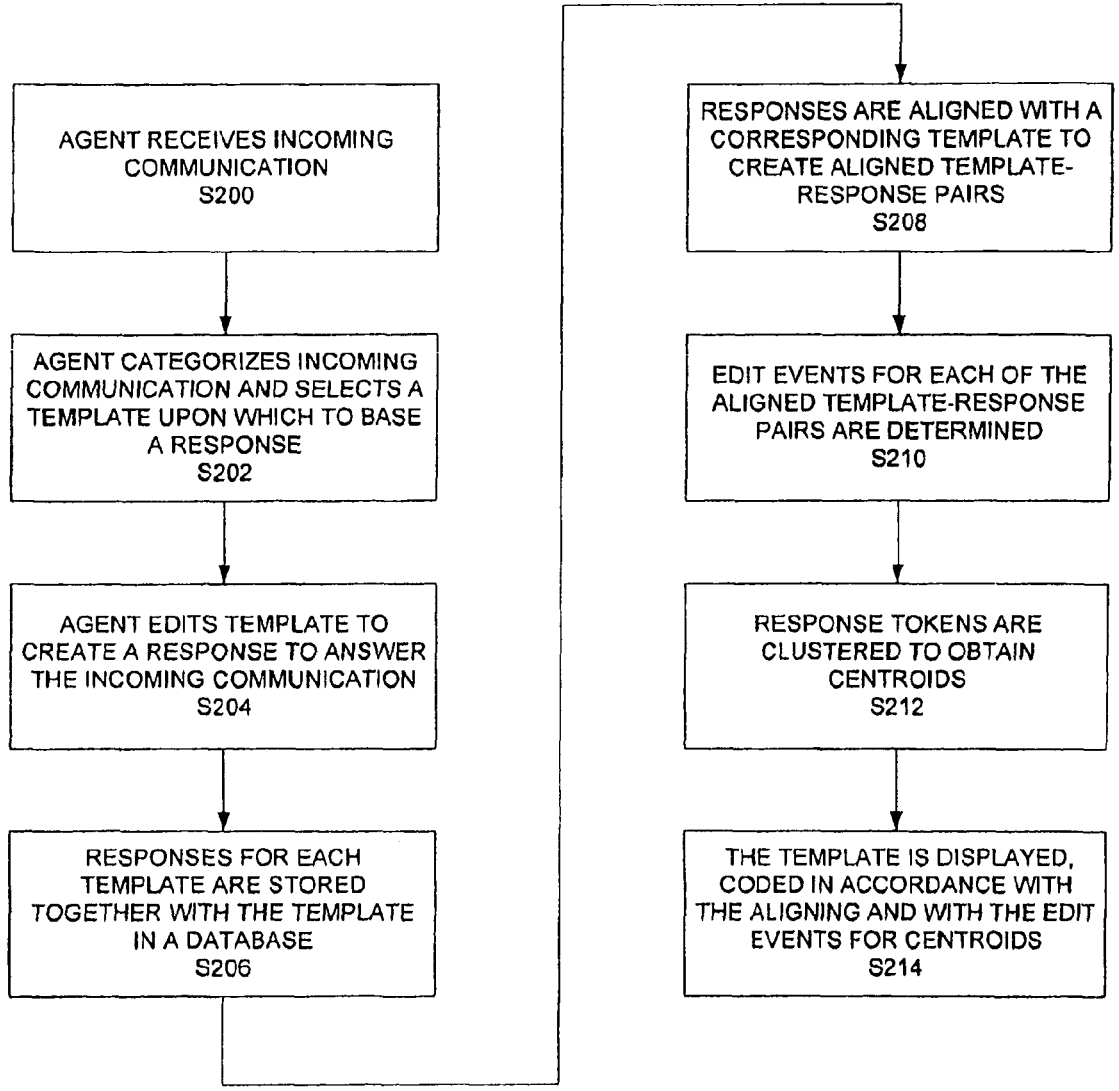
FIG. 2 is a process flow diagram for displaying edits to a template, according to an aspect of the present disclosure.

In step S200 of FIG. 2, an agent receives an incoming communication from a customer at a customer service center. The incoming communication may be a facsimile, text message, instant message, electronic mail. The agent may be a human agent or may be automated. The agent categorizes the incoming communication based on the issue or request in the incoming communication and selects a predefined template for responding to the incoming communication from a corresponding category in step 202. In step 204, the agent edits the template to create a response for answering incoming communication. For example, the agent may personalize the template to include the customer's name, the agent's name and contact information, as well as other pertinent information for responding to the incoming communication. In step 206, the response prepared based on the template is sent to the originator of the incoming communication. In addition, the response is stored in a database with the corresponding template from which the response was prepared.

In step 208, each response is aligned with a corresponding template at a predetermined level of granularity to create aligned template-response pairs. For example, each response may be aligned with a corresponding template at a sentence level of granularity. The degree to which the template was edited to create the response is determined. The template and response may be aligned based on, for example, the Levenshtein edit distance metric between tokens. Each sentence, paragraph or word or other level of granularity at which the template is examined is referred to as a token. This metric measures the number of edits (i.e., substitution, deletions and insertions) that are needed to transform a template into a response and is described by example in FIG. 9. The algorithm for determining the distance between the template and an individual response will be discussed in greater detail with respect to FIG. 3.

In step S210, edit events for each of the aligned template-response pairs are determined. That is, the particular edits (i.e., substitution, deletions and insertions) that are needed to transform a template into a response are obtained. The edit events are obtained by using, for example, the Levenshtein edit distance metric. In step S212, response tokens (i.e., sentences) are clustered to obtain centroids. The clustering process will be discussed in greater detail with respect to FIG. 4.

In step S214, the template is displayed and coded in accordance with the aligning (e.g., frequency of editing) based on an edit count. The template is also displayed with edit events for centroids (e.g., representative response sentences for each cluster) determined by the clustering process. That is, the centroid for each cluster is a sentence in a response. Accordingly, the edit events need to transform the template into the centroid determined in step S210 are displayed with the template. In addition, other frequently occurring edit events for each sentence may be observed when a cursor or similar selection device selects each sentence. The number of edits may be normalized by the number of words in the template to obtain a morphing score, which can also be displayed with the coded template. A morphing score can be determined for a single email or averaged per agent or per template used. A morphing score may range from 0 to 100, with 100 representing a template which had not been edited at all.

FIG. 3 illustrates the algorithm for determining the distance between the response and template. As an exemplar, response tokens are sentences. The rationale for this tokenization is that the visualization of the edits is more meaningful when aggregated at the sentence level rather than at the word level. Given a set of responses R that an agent creates using a template T, the algorithm proceeds as follows. Each of the sentences in the template and the set of responses are mapped to an integer index (Line 1). The template T and each of the responses in R are split into sentences and mapped into index sequences (Line 4 and Line 7). The alignment between the two index strings is computed in Line 8. From the alignment that maps $s_i$ to $r_j$, the set of response sentences associated with each template sentence (Line 11-14) are collected. These sentences are then clustered using k-median cluster method (illustrated in FIG. 4) in line 20.

FIG. 4 depicts the algorithm for clustering tokens, or sentences in each response. The algorithm restricts the centroid of a cluster to be one of the members of the set of responses being clustered, for example, a sentence of a response. The distance function to measure the closeness of two strings is instantiated to be an n-gram algorithm overlap between the two strings. The algorithm iterates over three steps until the sentences are partitioned into k clusters (Line 5). The first step (lines 6-10) is the initialization of a centroid for a new cluster. Initially, when the data is not partitioned into any cluster, the median string of the data set is used as the initial centroid. For subsequent iterations the farthest point (i.e., sentence) from all the centroids thus far is used as the centroid for a new cluster. In the second step (Lines 11-16), each member of the data set is assigned to the nearest cluster based on its distance to that cluster's centroid. Finally, in the third step (Lines 17-20), the cluster centroids are recomputed based on the new cluster memberships. Steps two and three are repeated until there are no changes in the cluster memberships and cluster centroids. The process is repeated for each set of aligned sentences in the set of responses.

Figure 5:
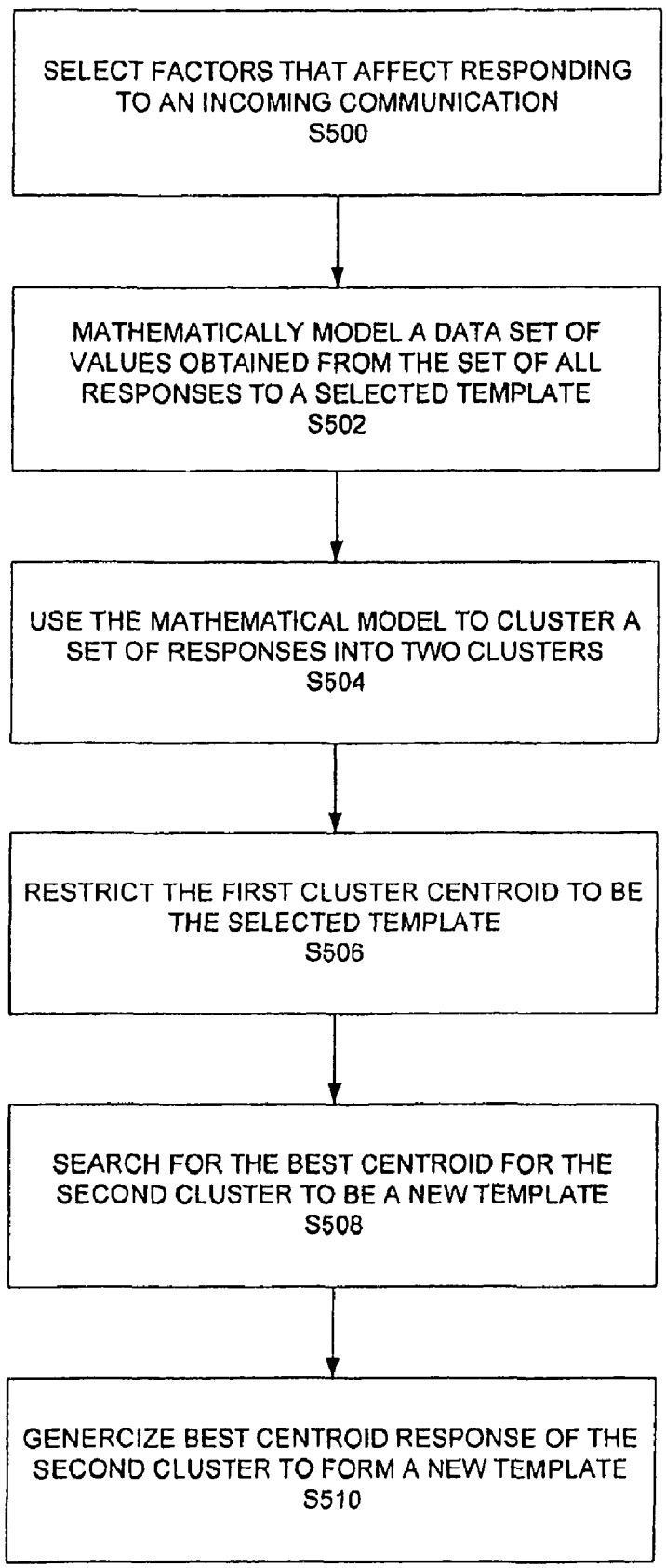
FIG. 5 is a process flow diagram for extracting a new template from a set of responses to a current template.

In FIG. 5, a process flow diagram for automatically extracting a potential new template is shown. An objective of the present disclosure includes extracting a potential new template from a set of responses to a current template. In certain instances, a current template will need to be heavily edited in order to obtain an appropriate response to an incoming communication. In such cases, the current template is most likely not the best template upon which to base a response. Accordingly, one of the responses from the set of all responses based on the current template may actually be the most suitable for basing a response. In this regard, a set of responses R is partitioned into two clusters R1 and R2, with centroids T (current template) and T' (new template) such that the constraint shown in EQ. 1 holds.

$$(\forall_{r \in R_1} AHT(T,r) < AHT(T',r)) \wedge (\forall_{r \in R_2} AHT(T',r) < AHT(T,r)) \qquad \text{EQ.1}$$

In step S500, factors that affect responding to an incoming communication are selected. Exemplary factors that affect average handling time include the length in words of the customer's incoming communication (inplen), the length in words of the template (templatelen), the length in words of the response (resplen), the total number of edits between the template and the response (edit), the normalized edit score (nedit), the number of individual events of the edit distance—substitution (sub), insertion (ins), deletion (del), and identity (id), the number of block (contiguous) substitution (blksub), block insertion (blkins), and block deletion (blkdel). Using the selected factors as independent variables, a data set of values obtained from the set of all responses to a selected template is mathematically modeled in step S502. An example linear regression equation is shown in EQ. 2 and corresponding data and error statistics are shown in Table 1.

$$\text{Average Handling Time} = 0.5314*\text{inplen} - 2.7648*\text{templatelen} + 1.9982*\text{resplen} - 0.5822*\text{edit} + 2900.5242*\text{nedit} + 4.7499*\text{id} - 0.16647*\text{del} - 1.6021*\text{ins} + 26.6704*\text{blksub} - 15.239*\text{blkins} + 24.3931*\text{blkdel} - 261.6627. \quad \text{EQ. 2}$$

TABLE 1

Data statistics for regression equation shown in EQ. 2

| | |
|---|---|
| Mean Average Handling Time | 675.74 seconds |
| Median Average Handling Time | 543 seconds |
| Mode Average Handling Time | 366 seconds |
| Standard Deviation | 487.72 seconds |
| Correlation coefficient | 0.3822 |
| Mean absolute error | 320.2 seconds |
| Root mean squared error | 450.64 seconds |
| Total Number of Instances | 6175 |

In step S504, the mathematical model is used to cluster a set of responses into two clusters as described with respect to EQ. 1. Using the k-median clustering process as described earlier, the set of responses is partitioned into two clusters. In step S506, the first cluster centroid is restricted to be the current template. In step S508, the best centroid of the second cluster is obtained. In step 510, the response that is selected as the centroid of the second cluster is generalized to form a suitable template.

In FIG. 7a, a current template is shown. In FIG. 7b, a potential new template is shown as obtained from the process described with respect to FIG. 5.

In FIG. 6a, an exemplary template is shown. In one embodiment, an analyst is presented with a copy of text from a previous template and a coded version of the template. Each sentence or token at another predetermined level of granularity may be color coded to indicate how frequently agents have changed the sentence to obtain an appropriate response from the template. Alternatively, the template may be coded in accordance with another visual feature, for example, font type. In FIG. 6b, bold text 604 and 614 indicates that the sentences were edited in over 50% of responses created based on the template. Underlined text 606 and 610 indicates that the sentences were edited in between 30% and 50% of responses based on the template. Normal text 608 and 612 indicates that the sentences were edited in less than 30% of responses based on the template. The present disclosure is not limited to any particular color coding arrangement or division of percentages for coding for edited sentences.

In FIG. 6b, a morphing score 600 is shown in the upper right-hand corner of the template. Centroid text 620 indicates that bold text 604 has been deleted in 452 responses and centroid text 630 indicates that bold text 614 has been deleted in 452 responses created based on the template. More particularly, sentences indicated to have been edited with a relatively high frequency based on their display in bold text are displayed alongside with the substance of the most commonly occurring edit event. Centroid texts 622 and 628 indicate that responses were edited to include two extra sentences with a relative amount of frequency. Centroid text 624 indicates that moderately edited underlined text 606 was substituted with the phrase "I need you to reply back" with the phrase "please provide me." Centroid text 626 indicates that underlined text 610 "amount of last bill" was substituted with "social security number."

Figure 6C:
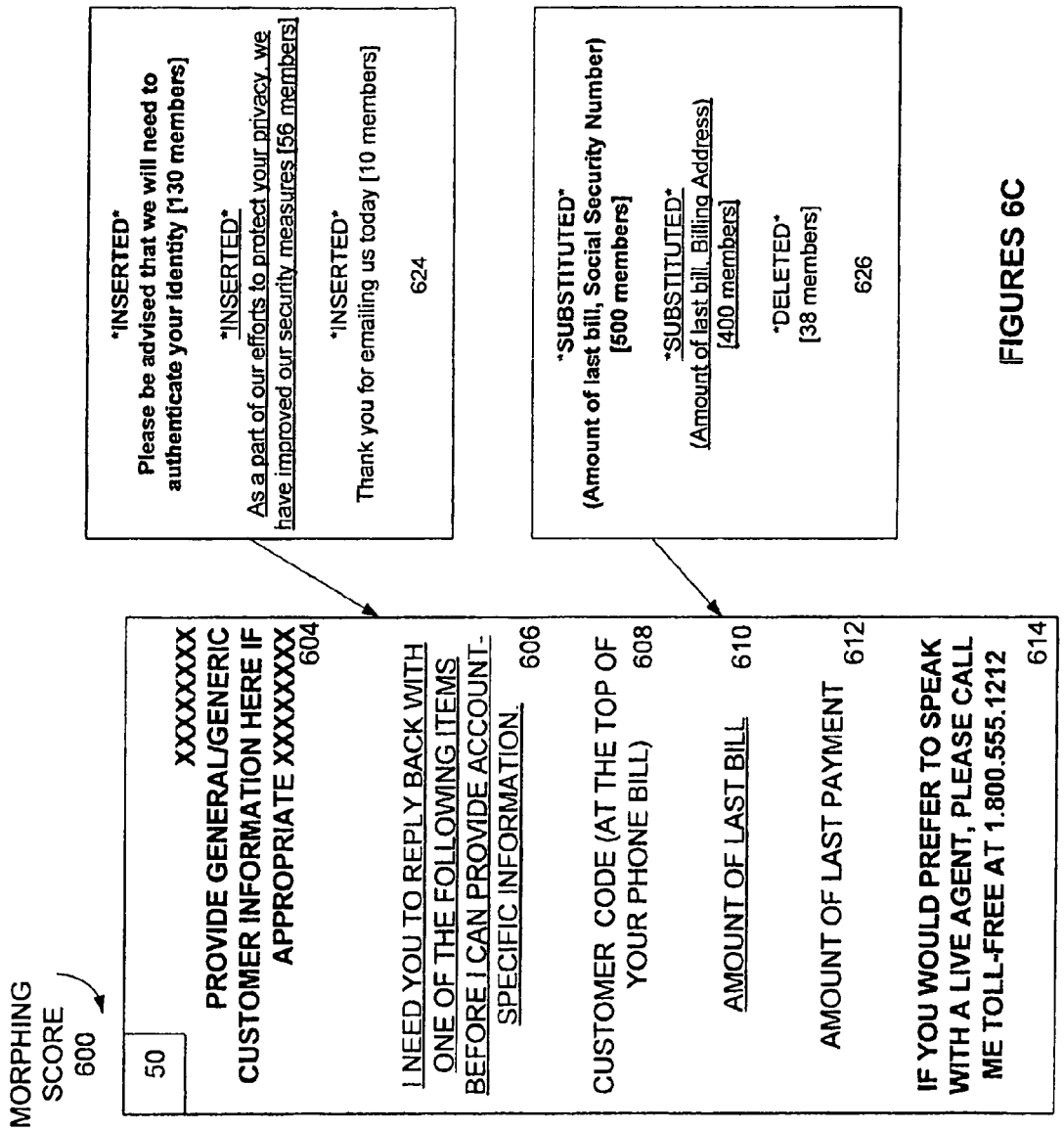
FIG. 6C shows a visually coded template displayed with visually coded edit event events.

In FIG. 6c, centroids 624 and 626 are coded. As an example, the three best centroids are shown. Alternatively, the three most frequently occurring edit events may also be shown. Each of the edit events shown may be coded to indicate the frequency of occurrence, or other characteristic with respect to the edit. For example, the first sentence in centroid 624 is displayed in bold text, indicating that this insertion was made the most number of times which respect to the template. Further, the first sentence of the centroid 624 indicates that the template was edited to include the sentence "Please be advised that we will need to authenticate your identity", or a sentence a trivial distance away from this sentence, by 130 agents. As can be seen by the third sentence of centroid 624, only ten agents inserted the sentence "Thank you for emailing us today."

Figure 9:
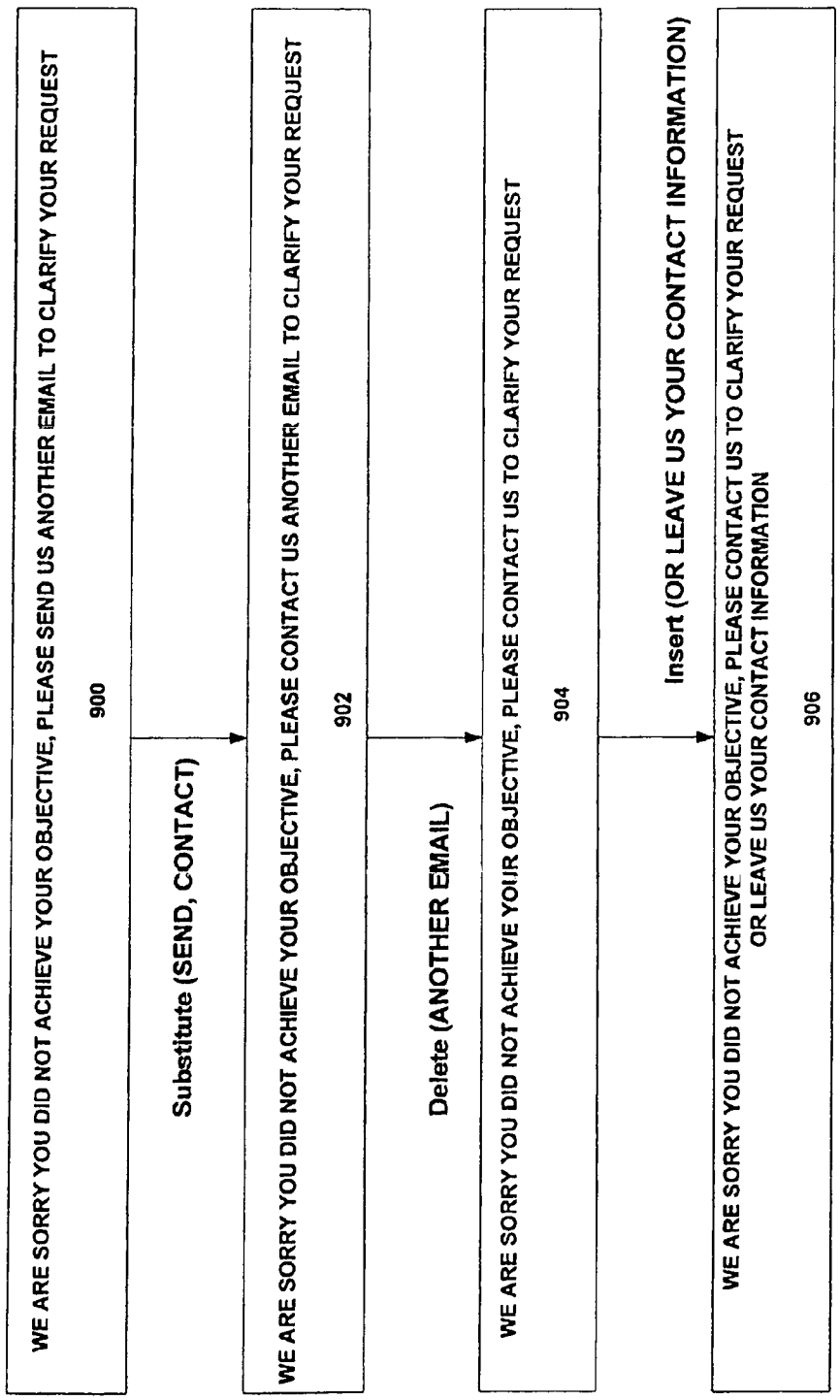
FIG. 9 shows an example for determining the Levenshtein distance between two strings.

In FIG. 9, an example of applying a Levenshtein distance metric to determine the distance between two sentences is shown. To transform the initial sentence 900 into final sentence 906, initially, the term "send" is substituted with the term "contact". Subsequently, in intermediate sentence 902, the phrase "another email" is deleted. Finally, in intermediate sentence 904, the phrase "or leave us your contact information is inserted into the sentence to obtain final sentence 906.

Figure 10:
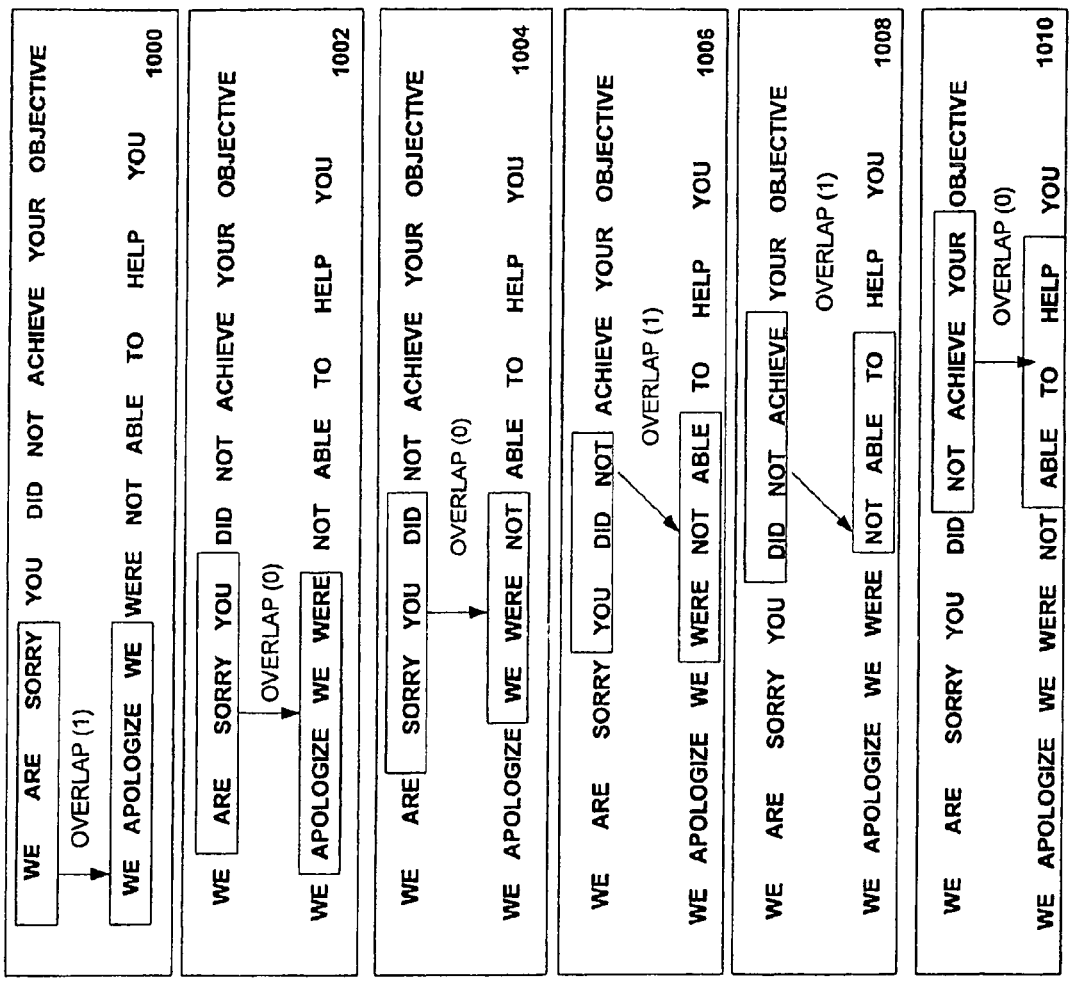
FIG. 10 shows an example for determining the n-gram overlap between two strings.

In FIG. 10, an example of applying the n-gram algorithm to determine the overlap between two sentences is shown. A sliding window as shown in FIG. 10 is shown as encompassing three words. A token or word overlap is determined for each sliding window of tokens, as the sliding window is incrementally moved by one word. In box 1000, the word overlap between a sliding window (i.e. "We are sorry") for the first sentence and a sliding window (i.e. "We apologize we) for the second sentence is one word, "We". In box 1002, there is no overlap between the first sentence and the second sentence. There is no overlap between the first sentence and the second sentence in box 1004. In box 1006, the sliding window "you did not" for the first sentence and the sliding window "were not able" for the second sentence overlap by one word, "not". The sliding window for the first sentence "did not achieve" and the sliding window for the second window "not able to" overlap by one word, "not" in box 1008. In box 1010, there is no overlap between the sliding window for the first sentence and the sliding window for the second sentence. As the sliding windows move incrementally through the first sentence and the second sentence (not shown), no more word overlap is detected. Accordingly, a token overlap for the first sentence and the second sentence shown in FIG. 10 is three words.

Accordingly, the present invention enables the display of edit information with respect to a template used to prepare a response to an incoming communication.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the present disclosure is not limited to written communications. The processes described in the present disclosure may be applied with respect to a transcription of a telephone call. Further, the present disclosure is not limited to use with regard to customer care centers. Rather, the invention may be applied in any pertinent situation where a response is determined based on a predefined template for responding to a request.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission of electronic communications represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for monitoring edits to a template for responding to an incoming communication, comprising:
   categorizing the incoming communication into at least one category associated with the template for a response to the incoming communication;
   determining distances between the template and each of a set of responses based on the template, at a predetermined level of granularity;
   coding the template in accordance with the determined distances; and
   displaying the coded template,
   wherein the template is coded according to color, and
   wherein the template is displayed with a morphing score determined based on edits made to the template.

2. The method according to claim 1, further comprising determining edit events at the predetermined level of granularity.

3. The method according to claim 2,
   wherein the edit events are based on substitutions, insertions and deletions to the template at the predetermined level of granularity.

4. The method according to claim 2,
   wherein a subset of the edit events are selected for display based on clustering tokens comprising each of the set of responses.

5. The method according to claim 4,
   wherein the subset of edit events are displayed coded in accordance with a selected characteristic.

6. The method according to claim 5,
   wherein the selected characteristic is a frequency of occurrence.

7. The method according to claim 4,
   wherein overlap among tokens is determined based on at least one of an n-gram overlap algorithm and a Levenshtein distance metric.

8. The method according to claim 7,
   wherein the tokens are clustered based on a k-median algorithm.

9. The method according to claim 4,
   wherein centroids determined as a result of clustering are displayed with the template at each predetermined level of granularity.

10. The method according to claim 1, wherein the predetermined level of granularity is one of a word, sentence and paragraph.

11. A method for extracting a new template based on responses to an existing template, comprising:
- selecting factors that affect quantitative measures for preparing a response to an incoming communication;
- using a mathematical model of the factors to cluster a set of responses created based on the existing template into two clusters;
- restricting a first cluster centroid to be the existing template; and
- searching, using a processor of a computer, for a second cluster centroid for a second cluster.

12. The method according to claim 11, wherein the second cluster centroid is generalized to serve as the new template.

13. The method according to claim 11, wherein the incoming communication is at least one of: a facsimile, electronic mail, text message and instant message.

14. The method according to claim 11,
wherein a quantitative measure for determining a response based on the new template is less than a quantitative measure for determining a response based on the existing template, and
wherein a qualitative characteristic of the response based on the new template is superior to a qualitative characteristic of the response based on the existing template.

15. The method according to claim 11, wherein factors comprise at least one of: the length in words of the incoming communication, the length in words of the response, the total number edits between the template and the response, the normalized edit score, the number of individual events of the edit distance, insertions, deletions, identity, the number of block substitutions, block insertions, and block deletions.

16. A tangible computer readable medium storing a computer program, recorded on the computer readable medium, for monitoring edits to a template for responding to an incoming communication, the medium comprising:
- a categorizing code, recorded on the tangible computer readable medium, executable to categorize the incoming communication into at least one category associated with the template for a response to the incoming communication;
- a determining code, recorded on the tangible computer readable medium, executable by a processor of a computer to determine distances between the template and each of a set of responses, at a predetermined level of granularity;
- an encoding code, recorded on the tangible computer readable medium, executable to code the template in accordance with the determined distances; and
- a displaying code, recorded on the tangible computer readable medium, executable to display the coded template,
wherein the template is coded according to color, and
wherein the template is displayed with a morphing score determined based on edits made to the template.

17. The computer readable medium according to claim 16, wherein the distance between the template and each of the set of responses is determined based on a Levenshtein edit distance metric.

18. The computer readable medium according to claim 16, wherein the template is displayed with a morphing score normalized with respect to a length of the template.

19. The computer readable medium according to claim 16, wherein a previous coded version of the template is displayed with the coded template.

* * * * *